Patented Dec. 30, 1952

2,623,910

UNITED STATES PATENT OFFICE 2,623,910

CHLORINATED AROMATIC COMPOUNDS

Preston Robinson, Williamstown, Mass., and Colin C. Reid, Arlington, Va., assignors to Sprague Electric Company, North Adams, Mass., a corporation of Massachusetts No Drawing. Application April 26, 1947, Serial No. 744,164

4 Claims. (Cl. 260—649)

Our invention relates to a new class of halogenated aromatic compounds and more specifically refers to certain halogenated aromatic compounds suitable for use in dielectric compositions. This application is a continuation-in-part of our U. S. Patent application, S. N. 607,500, filed on July 27, 1945.

Halogenated aromatic compounds are well known and widely employed in dielectric compositions for electrical condensers, transformers and related electrical devices. In particular, the chlorinated diphenyls have been used extensively as dielectric impregnants for condensers, as well as for flame-proofing, heat-exchanging and other applications requiring a more or less non-inflammable material.

The chlorinated diphenyls are generally produced by chlorinating diphenyl, until the desired average number of chlorine atoms per molecule have been substituted for hydrogen atoms on the diphenyl molecule. Generally, the percentage of chlorine in the final product ranges from about 54% to about 60%, if the material is to be used as a dielectric impregnant. The chlorinated product is a mixture of isomers of hexachlor-, pentachlor-, tetrachlor- and possibly trichlordiphenyl. The exact composition is never known, and the isomers can be separated only with extreme difficulty, if at all. The mixture of isomers is particularly useful, since it is generally a viscous mass or oil, rather than a solid, at room temperature. In other words, a low melting eutectic is formed, the melting point thereof being considerably lower than most or all of the individual isomeric constituents of the mixture.

The aforesaid mixture of chlorinated diphenyls generally possesses a relatively high dielectric constant, for example, from about 4 to about 5, and a reasonably low power factor (electrical loss) at low frequencies. The electrical stability of the material is satisfactory, although there are certain difficulties attending the use thereof. Electrical condensers generally employ electrodes made of aluminum foil. Upon operation of a condenser impregnated with chlorinated diphenyl, evolution of small amounts of hydrochloric acid may occur. While this in itself is undesirable, it is further complicated by the reaction that occurs between the hydrochloric acid formed and the aluminum foil, the product thereof being aluminum chloride, the catalyst used in the Friedel-Crafts reaction. This produces still further reactions, often resulting in complete deterioration of the dielectric, and in some cases, bursting of the container of the condensers due to the pressure of evolved gases. Careful purification of the chlorinated diphenyls will not overcome their tendency to give off hydrochloric acid in an electrical field, with the foregoing undesirable results. These compounds also have a tendency to hydrolyze in the presence of water.

It is an object of this invention to produce new compositions free from the foregoing and related disadvantages. It is a further object to produce new halogenated aromatic dielectric compositions. A still further object is to produce unusually stable and heretofore unattainable dielectric compositions. Another object is to produce improved electrical condensers which are stable over extended periods of operation. Yet another object is to produce new and useful halogenated aromatic compounds. Additional objects will become apparent from a consideration of the following description and claims.

These objects are attained in accordance with the present invention wherein there is produced a halogenated aromatic dielectric composition in which halogen and hydrogen atoms are not substituted on the same or adjacent carbon atoms. In a more restricted sense, the invention is concerned with dielectric compositions predominating in one or more compounds conforming to the general formula:

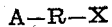

wherein A represents an aromatic hydrocarbon radical, such as phenyl, alkylated phenyl, diphenyl, naphthyl, alkylated naphthyl, binaphthyl, etc.; R represents a bivalent alkyl radical; and X represents a fully halogenated phenyl radical, such as pentachlorophenyl, pentafluorophenyl, trichlorodifluorophenyl, etc.

In a still more restricted sense, the invention is concerned with dielectric compositions predominating in one or more compounds conforming to the general formula:

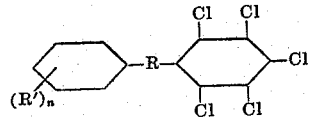

wherein R represents the methylene, ethylidene, propylidene, vinylene, ethylene, trimethylene, or vinylidene radical; R' represents an alkyl radical; and $n$ represents an integer from 0 to 5.

The invention is further concerned with processes adapted to produce the aforesaid compounds. The invention is still further concerned with electrical condensers employing the dielectric compositions described herein.

We have made the surprising discovery that polar compositions of heretofore unattainable electrical and chemical stability may be produced by employing halogenated aromatic compounds having a specific and novel molecular structure. According to the invention described herein, we produce novel halogenated aromatic compounds in which halogen and hydrogen atoms are not located on the same or adjacent carbon atoms. This atomic spacing apparently effectively limits the undesirable and heretofore unavoidable tendency of the hydrogen and halogen to combine and break away from the parent molecule as a hydrogen halide. In the usual chlorinated aromatic compound, hydrogen and chlorine atoms are located on some adjacent carbon atoms, and therefore the opportunity for combination is enhanced by the proximity of the atoms and the activity of the chlorine. Furthermore, our new compounds show no tendency to hydrolyze in the presence of water.

According to one of the preferred embodiments of the invention, we prepare dielectric compositions composed predominantly of one or more compounds conforming to the general formula:

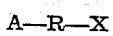

wherein A represents an aromatic hydrocarbon radical; R represents a bivalent alkyl radical; and X represents a fully halogenated phenyl radical. Falling within the scope of this general formula are the following representative compounds:

Pentachlorophenyl, phenyl methane
Pentachlorophenyl, tolyl methanes
Pentachlorophenyl, xylyl methanes
Pentachlorophenyl, phenyl ethanes
Pentachlorophenyl, tolyl ethanes
Pentachlorophenyl, xylyl ethanes
Pentachlorophenyl, phenyl ethylenes
Pentachlorophenyl, tolyl ethylenes
Pentachlorophenyl, phenyl propanes
Pentachlorophenyl, phenyl propylenes
Pentafluorophenyl, phenyl methane
Pentafluorophenyl, phenyl ethanes, etc.

According to one of the specific and preferred embodiments of the invention, the dielectric compositions are composed predominately of one or more compounds conforming to the following, more limited formula:

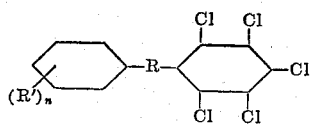

wherein R represents the methylene, ethylene or ethylidene radical; R' represents an alkyl radical; and n represents an integer from 0 to 5. Illustrative of the specific compounds conforming to the above formula are the following:

Pentachlorophenyl, phenyl methane
Pentachlorophenyl, tolyl methanes
1 pentachlorophenyl, 1 phenyl ethane
1 pentachlorophenyl, 2 phenyl ethane
1 pentachlorophenyl, 1 (2 tolyl) ethane
1 pentachlorophenyl, 1 (3 tolyl) ethane
1 pentachlorophenyl, 1 (4 tolyl) ethane
1 pentachlorophenyl, 2 (2 tolyl) ethane
1 pentachlorophenyl, 2 (3 tolyl) ethane
1 pentachlorophenyl, 2 (4 tolyl) ethane
1 pentachlorophenyl, 1 (2,3 xylyl) ethane
1 pentachlorophenyl, 1 (2,4 xylyl) ethane
1 pentachlorophenyl, 1 (2,5 xylyl) ethane
1 pentachlorophenyl, 1 (3,4 xylyl) ethane
1 pentachlorophenyl, 1 (2,6 xylyl) ethane
1 pentachlorophenyl, 1 (3,5 xylyl) ethane
1 pentachlorophenyl, 2 (2,3 xylyl) ethane
1 pentachlorophenyl, 2 (2,4 xylyl) ethane
1 pentachlorophenyl, 2 (2,5 xylyl) ethane
1 pentachlorophenyl, 2 (3,5 xylyl) ethane
1 pentachlorophenyl, 2 (3,4 xylyl) ethane
1 pentachlorophenyl, 2 (2,6 xylyl) ethane
1 pentachlorophenyl, 1 (2 ethyl phenyl) ethane
1 pentachlorophenyl, 1 (3 ethyl phenyl) ethane
1 pentachlorophenyl, 1 (4 ethyl phenyl) ethane
1 pentachlorophenyl, 2 (2 ethyl phenyl) ethane
1 pentachlorophenyl, 2 (3 ethyl phenyl) ethane
1 pentachlorophenyl, 2 (4 ethyl phenyl) ethane
1 pentachlorophenyl, 1 (2,3 diethyl phenyl) ethane
1 pentachlorophenyl, 1 (2,4 diethyl phenyl) ethane
1 pentachlorophenyl, 1 (2,5 diethyl phenyl) ethane
1 pentachlorophenyl 1 (3,4 diethyl phenyl) ethane
1 pentachlorophenyl, 1 (2,6 diethyl phenyl) ethane
1 pentachlorophenyl, 1 (3,5 diethyl phenyl) ethane
1 pentachlorophenyl, 2 (2,3 diethyl phenyl) ethane
1 pentachlorophenyl, 2 (2,4 diethyl phenyl) ethane
1 pentachlorophenyl, 2 (2,5 diethyl phenyl) ethane
1 pentachlorophenyl, 2 (3,4 diethyl phenyl) ethane
1 pentachlorophenyl, 2 (2,6 diethyl phenyl) ethane
1 pentachlorophenyl, 2 (3,5 diethyl phenyl) ethane
1 pentachlorophenyl, 1 (2 propyl phenyl) ethane
1 pentachlorophenyl, 2 (3 isopropyl phenyl) ethane
1 pentachlorophenyl, 1 (3 butyl phenyl) ethane
1 pentachlorophenyl, 2 (4 isobutyl phenyl) ethane
1 pentachlorophenyl, 1 (2 amyl phenyl) ethane
1 pentachlorophenyl, 2 (4 amyl phenyl) ethane
1 pentachlorophenyl, 1 (3 hexyl phenyl) ethane While the invention is particularly directed to compounds having two benzene rings in each molecule, it is to be understood that the principles embodied herein may likewise be applied to other aromatic molecules, for example, those containing naphthalene, bi-naphthyl, etc. ring systems. Among the simplest and preferred of such compounds are those in which a naphthalene or diphenyl structure replaces the unhalogenated benzene ring in the compounds listed above. Representative of these are the following:

Pentachlorophenyl, (1 naphthyl) methane
1 pentachlorophenyl, 1 (2 naphthyl) ethane
1 pentachlorophenyl, 2 (1 naphthyl) ethane
1 pentachlorophenyl, 2 (3 diphenyl) ethane While the many of the individual compounds referred to heretofore are liquids in the pure state, it is often advisable to blend two or more of them to obtain optimum physical characteristics, such as a low pour point, low viscosity, etc. Eutectics thus formed may be used to outstanding advantage in electrical condensers and related devices.

The dipole moment of the compounds of the invention is relatively high, and their dielectric constant is accordingly higher than that of the unhalogenated hydrocarbons. Thus the compounds may be substituted as dielectric impregnants for the chlorinated diphenyls, chlorinated naphthalenes, castor oils, etc. usually employed, without loss of capacity in the unit and without the instability usually associated with such high dielectric constant polar liquids.

According to another embodiment of the invention, the compounds of the invention may be produced by relatively simple processes. One of the most satisfactory processes involves a Friedel-Crafts type condensation. The reaction thereof may be represented by the following equation, in which the letters R, R' and the integer $n$ have the same meanings as those previously referred to:

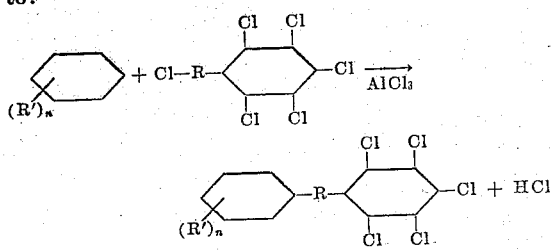

The aliphatic chlorine may be replaced by bromine with equally satisfactory results.

The following examples will further clarify some of the processes embraced herein:

EXAMPLE 1

*Preparation of 1 pentachlorophenyl, 2 phenyl ethane*

1.0 mole of benzene was placed in a three necked flask equipped with a stirrer, water-jacketed reflux condenser and a separatory funnel. 0.01 mole of aluminum chloride was added in the flask. 0.4 mole of beta-chloroethyl pentachlorobenzene, a solid possessing a melting point of about 90° C., was dissolved in 1.0 mole of benzene and added slowly to the reaction flask, while cooling the latter in an ice-water mixture. When the evolution of hydrogen chloride had slowed down, the reaction mixture was heated gently to 40–50° C. A yellow orange solid precipitated. After cooling to room temperature, the reaction mixture was poured into a mixture of ice, water, and hydrochloric acid. A large quantity of white, semi-solid material settled in the water layer. The benzene layer was removed by suction and dried over calcium chloride. The water layer, containing nearly a third of its volume in white solid, was filtered by suction. The white precipitate was allowed to stand while small amounts of benzene therein dried, and then recrystallized from benzene and methyl alcohol to give a melting point of 153–154° C.

The benzene layer was distilled and a fraction obtained, which, after recrystallization as above, gave a melting point of 153–154° C. This fraction boiled at 240–250° C. under 22 mm. pressure and is soluble in benzene and in ether, and insoluble in alcohol and in water.

A carbon, hydrogen and chlorine analysis of the material gave the following results:

|  | Percent C | Percent H | Percent Cl |
|---|---|---|---|
| Calculated | 47.5 | 2.56 | 50.0 |
| Observed | 47.3 | 2.73 | 49.4 |

EXAMPLE 2

*Preparation of 1 pentachlorophenyl, 2 (m-xylyl) ethane*

The procedure of Example 1 was repeated, using the following proportions of reactants:

|  | Moles |
|---|---|
| Beta-chloroethyl pentachlorobenzene | 0.5 |
| m-Xylene | 2.0 |
| Aluminum chloride | 0.01 |

The xylene layer obtained by pouring the reaction mixture onto water, ice and hydrochloric acid, was distilled as follows:

| Fraction | B. P. range in °C. (uncorrected) | Pressure in mm. Hg |
|---|---|---|
| 1. m-xylene | below 160 | atm. |
| 2. beta-chloroethyl pentachlorobenzene | 190–225 | 15–16. |
| 3. 1 pentachlorophenyl, 2 (m-xylyl) ethane. | 238–272 | 15–16. |

The third fraction containing the desired product was carefully redistilled into two separate fractions, B. P. 250–260° C. at 15 mm. and B. P. 260–272° C. at 16 mm. The lower boiling fraction gave the major yield and was recrystallized from benzene and alcohol to give a melting point of 127–134° C.

Analysis of both fractions indicated that they were 1 pentachlorophenyl, 2 (m-xylyl) ethane, in the form of an isomeric mixture, soluble in benzene and ether and insoluble in water and alcohol.

EXAMPLE 3

*Preparation of 1 pentachlorophenyl, 2 (o-xylyl) ethane*

In a five liter flask equipped with a stirrer, dropping funnel and reflux were placed 450 gms. of ortho-xylene and 13 gms. aluminum chloride. A mixture of 1347 gms. of beta-chloroethyl pentachlorobenzene and 450 gms. of ortho-xylene was added through the dropping funnel over a period of three quarters of an hour, the temperature in the flask being held at 70° C. Heating and agitation at this temperature were maintained for 24 hours. The mixture was poured into a beaker containing crushed ice and the organic layer washed with dilute sodium hydroxide and then with water. The ortho-xylene was removed at atmospheric pressure and the balance distilled at reduced pressure. After removal of unreacted intermediate (313 gms. of beta-chloroethyl pentachlorobenzene) the pressure was lowered to 2–3 mm., and 312 gms. of xylyl product distilled over at 167–169° C. The receiver was changed and 99 gms. with a boiling point of 169–173° C. at 2 mm. were obtained. The very high boiling residue amounted to 504 gms. The xylyl compound, B. P. 167–169° C., possessed a melting point of 87° C. in the crude state, and is presumed to have the structure 1 pentachlorophenyl, 2 (o-xylyl) ethane.

EXAMPLE 4

*Preparation of 1 pentachlorophenyl, 2 tolyl ethane*

80 gms. of beta-chloroethyl pentachlorobenzene was dissolved in 100 gms. of toluene. The mixture was added to a one liter, three necked flask equipped with a stirrer, reflux condenser and dropping funnel, the flask containing 4 gms. of aluminum chloride and 50 gms. of toluene. After the addition was complete, the flask was heated to 55° C. and maintained at this temperature for one hour and forty minutes. The product was allowed to cool and poured into an ice-hydrochloric acid mixture. The organic layer was separated and washed with dilute sodium hydroxide and with water, and then was dried with magnesium sulfate and filtered. The toluene was removed by distillation at atmospheric pressure, and the residue subjected to a vacuum distillation through a heated Vigreux column as follows:

| Fraction No. | Pressure | Boiling Range | Weight |
|---|---|---|---|
| | Mm. | | Gms. |
| 1 | .35 | up to 186° C | 7.5 |
| 2 | .35 | 186–196° C | 71 |
| Residue | .35 | over 196° C | 7 |

Fraction #2 had a crude melting point of 87–100° C., which upon recrystallization from benzene and alcohol was 95–107° C. Upon two recrystallizations from acetone the melting point was 108–119° C. The residue was an amber colored, resinous solid which is also useful as a dielectric resin, possessing good stability, high flash point and low viscosity at temperatures above 100° C. Fraction #2 has, per se, a dielectric constant of 3.4 and a power factor of .016% at 100° C., the power factor being much lower than that of the chlorinated diphenyls.

EXAMPLE 5

*Preparation of 1 pentachlorophenyl, 1 phenyl ethane*

2 gms. of aluminum chloride was taken up in 50 cc. of benzene in a flask provided with a reflux condenser, agitation, and a dropping funnel. Through the dropping funnel there was added over a two hour period a solution of 71.5 gms. of alpha-bromoethyl pentachlorobenzene, a solid with a melting point of about 124° C. in the pure state, dissolved in 250 cc. of benzene. Agitation was continued for two hours after the addition was complete. The temperature was kept at about room temperature. The benzene solution was washed with water, 10% sodium hydroxide and then with water again. The solution was dried with magnesium sulfate and distilled to remove the unreacted benzene.

The crude product which remained as a residue after distillation, had a melting point of 105–110° C. The product was recrystallized from benzene and absolute alcohol to give a melting point of 108–110.5° C. The yield of crude product was substantially quantitative, and distillation of the reaction mixture (other than removal of benzene) was not required.

EXAMPLE 6

*Preparation of 1 pentachlorophenyl, 1 tolyl ethane*

The procedure of Example 5 was followed with the exception that 715 gms. of alpha-bromoethyl pentachlorobenzene was dissolved in 1.5 liters of toluene and was run into a solution of 20 gms. of aluminum chloride dissolved in a liter of toluene, the toluene replacing the benzene of Example 5. Upon working up in the usual manner, the major product distilled at 199–200° C. at 1.7–.7 mm., giving a weight of 645 gms., a 91% yield of 1 pentachlorophenyl, 1 tolyl ethane.

The product was a viscous liquid at room temperature, which solidified after a long period of standing.

EXAMPLE 7

*Preparation of pentachlorophenyl, tolyl methane*

900 cc. of toluene and 14.8 gms. of aluminum chloride were placed in a three liter, three necked flask equipped with a stirrer, reflux condenser, thermometer and dropping funnel. Agitation was begun and a solution of 747 gms. of pentachloro benzyl chloride, a solid possessing in its pure state a melting point of about 103° C., dissolved in 1220 cc. of toluene was added over a period of 1½ hours. The temperature went from 25 to 37° C. during the addition. The mixture was allowed to stand with agitation over night at room temperature. In the morning, ice was added, and the organic layer was separated and washed twice with a sodium hydroxide solution and twice with a salt solution. Moisture was then removed with dry magnesium sulfate, and the mixture filtered to remove inorganic material. The toluene was removed from the filtrate, at reduced pressure, and the residue was fractionated as indicated below:

| Fraction No. | Pressure | Boiling Range | Weight | Appearance |
|---|---|---|---|---|
| | Mm. | | Gms. | |
| 1 | .25 | up to 178° C | 88 | high melting white solid. |
| 2 | .35–.65 | 171–182° C | 717 | white mass. |
| Residue | | | 30 | |

Fraction #2 was redistilled at a pressure of about .3 mm. to remove traces of the high melting material over a temperature range of 173–180° C. to give 677 gms. of a white crystalline solid with a melting point of 75–83° C. This is a mixture of isomers of pentachlorophenyl, tolyl methane.

It is to be understood that numerous other methods may be employed in the production of the final products of the types described above. For instance, it is contemplated that the following methods may be employed without departing from the spirit and scope of the invention:

Benzyl chloride or bromide and alkyl derivatives thereof may be reacted with pentachlorobenzene in the Friedel-Crafts reaction.

Styrene or a ring alkylated derivative thereof may be reacted with pentachlorobenzene by use of a suitable condensing catalyst. Alternatively, pentachlorostyrene may be condensed, again by use of a suitable condensing agent, with an aromatic hydrocarbon.

In order to produce the unsaturated compounds referred to previously, it is preferable to couple the intermediates to form a saturated product and subsequently produce the desired unsaturation. The presence of aluminum chloride during the Friedel-Crafts reaction may cause polymerization, etc. of unsaturated aliphatic groups.

As specific examples of unsaturated compounds of the invention, we may mention the following:

| Unsaturated Group | Compound |
|---|---|
| Vinylidene | 1 pentachlorophenyl, 1 phenyl ethylene. |
| Vinylene | 1 pentachlorophenyl, 2 phenyl ethylene. |

These may be produced by dehydrogenating the corresponding ethane compounds, by dehydrohalogenating a chloroethane derivative, etc. The unsaturated compounds are difficult to polymerize per se.

It is likewise possible to produce desirable compounds with alkyl groups on the unhalogenated aryl ring, by alkylating the latter ring after producing the basic compound, e. g. 1 pentachlorophenyl, 2 phenyl ethane may be converted to valuable compounds in which the phenyl radical is alkylated.

In commercial practice, the Friedel-Crafts condensation discussed herein may be conducted between a chloroalkyl pentachlorobenzene and a mixture of aromatic hydrocarbons, such as a coal tar fraction containing benzene, toluene, xylene, etc., since the resulting product will exhibit a low melting point because of the large number of isomers present. It can be readily seen that any desired mixture may be produced by selection of the proper aromatic hydrocarbon reactants and amounts thereof. Knowing the reaction rates of each of these with respect to the others, halogenated biaryl mixtures of approximately predetermined composition can be produced.

Since it is possible to produce a large number of similar and/or isomeric compounds in accordance with the invention, it is possible to mix several compounds, normally solid at room temperature, to form eutectic liquids which are more or less viscous in nature. Particularly useful for such purpose are mixtures of 1, 1 diaryl ethanes and 1, 2 diaryl ethanes, as well as isomeric propanes, butanes, etc. Likewise, compounds capable of isomeric forms are valuable, e. g. the tolyl, xylyl and ethyl reaction products. When single long chain alkyl groups, such as amyl and hexyl, are present on the unhalogenated aryl ring, the melting point of the pure compound is very low.

According to another preferred embodiment of the invention, the compositions disclosed herein may be admixed with completely substituted alkyl chloro- and alkyl fluoro benzenes and other similarly substituted aromatic compounds, to produce eutectic liquids and waxes of unusually desirable properties. The compounds added should, for electrical purposes, preferably conform to the structure earlier defined, i. e. halogen and hydrogen atoms should not be substituted on the same or adjacent carbon atoms. Among the numerous compounds falling in this category are the following:

Pentafluorotoluene
Diethyl tetrachlorobenzenes
Ethyl pentachlorobenzene
Methyl pentachlorobenzene
Dimethyl tetrachlorobenzenes
Trimethyl trichlorobenzenes
Tetramethyl dichlorobenzenes
Pentamethyl chlorobenzene
Pentachlorobenzotrichloride As a specific example, the 1 pentachlorophenyl, 2 tolyl ethane product of Example 4 was admixed and molten in equal proportion with ethyl pentachlorobenzene, which does not have chlorine and hydrogen atoms on adjacent carbon atoms. The resulting eutectic had a melting point of about 14° C. It was a viscous liquid. The liquid was refined and the electrical properties thereof determined, over a range from about 25° C. to about 100° C. The dielectric constant varied from about 3.50 to about 4.0 at 60 cycles and at 1000 cycles per second, while the power factor at these frequencies was .3% or below. The direct current resistivity in ohm centimeters was $45{,}000 \times 10^9$ or greater over the temperature range indicated.

Although the invention has been directed toward dielectric compositions predominating in one or more of the compounds of the invention, we have found that the new compounds are of value in modifying the properties of chlorinated diphenyls as well as related liquid, semi-liquid, or solid chlorinated dielectric materials. In addition, they produce resins of excellent properties, when admixed with polyvinyl resins, such as polystyrene, polyvinyl carbazole, etc. These compounds may be added to the vinyl compound or compounds before, during or after polymerization thereof. They are effective as plasticizers therefor.

While the dielectric compositions disclosed herein are of value as dielectric impregnants generally, they are of particular value for high voltage, alternating current condensers, such as those employed in correcting the power factor of power transmission lines. Further, they are of outstanding value in small volume, high capacity condensers. The stability of the new dielectric compositions in an electrical field is surprisingly greater than that of the usual chlorinated diphenyls.

As previously mentioned, the new compounds of the invention are of value as non-inflammable, heat-transfer agents, and in other applications in which chlorinated diphenyls and related materials have been used or are capable of use.

The individual compounds, as well as mixtures thereof, are also useful as fungicides, mildew-proofing agents, moth-proofing agents and related preparations. Due to the high boiling point and low vapor pressures of the new compounds disclosed herein, they may be employed in coatings to be subjected to adverse conditions for extended periods of time without evaporation. The compounds of the invention appear to be relatively non-toxic to humans, a further advantage over chlorinated diphenyl and naphthalene.

Small amounts of mineral oils and other high boiling hydrocarbon oils may be added to depress the freezing points of compounds and mixtures of the invention. However, this is rarely necessary.

As many apparently widely different embodiments of this invention may be made without departing from the spirit and scope thereof, it is to be understood that the invention is not limited to the specific embodiments thereof, except as defined in the appended claims.

What we claim is:

1. A mixture of chlorinated aromatic compounds conforming to the general formula

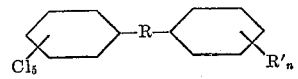

wherein R represents a bivalent alkyl radical containing from 1 to 2 carbon atoms, R' represents an alkyl radical containing from 1 to 6 carbon atoms and $n$ represents an integer from 0 to 2, said mixture resulting from the Friedel-Crafts condensation of a compound conforming to the general formula

wherein R represents a bivalent alkyl radical containing from 1 to 2 carbon atoms and X represents a halogen radical with a compound conforming to the general formula

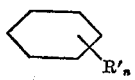

wherein R' represents an alkyl radical containing from 1 to 6 carbon atoms and $n$ represents an integer from 0 to 2.

2. A mixture of isomeric 1-pentachlorophenyl-2-tolylethanes resulting from the Friedel-Crafts condensation of a beta-haloethyl pentachlorobenzene with toluene.

3. A mixture of isomeric pentachlorophenyl tolylmethanes resulting from the Friedel-Crafts condensation of pentachlorobenzyl chloride with toluene.

4. A mixture of isomeric 1-pentachlorophenyl-1-tolylethanes resulting from the Friedel-Crafts condensation of an alpha-haloethyl pentachlorobenzene with toluene.

PRESTON ROBINSON.
COLIN C. REID.

REFERENCES CITED

The following references are of record in the file of this patent:

UNITED STATES PATENTS

| Number | Name | Date |
|---|---|---|
| 2,012,302 | Clark et al. | Aug. 27, 1935 |
| 2,033,612 | Clark et al. | Mar. 10, 1936 |
| 2,171,855 | Levine et al. | Sept. 5, 1939 |
| 2,186,366 | Coleman et al. | Jan. 9, 1940 |
| 2,193,823 | Levine et al. | Mar. 19, 1940 |
| 2,233,404 | Dreisbach | Mar. 4, 1941 |
| 2,244,284 | Britton et al. | June 3, 1941 |